June 11, 1968 W. W. FISHER 3,388,313
FREQUENCY DOUBLER USING SERIES CONNECTED SWITCHES TO
CONTROL LOAD CURRENT POLARITY
Filed Aug. 10, 1965 2 Sheets-Sheet 1

INVENTOR.
WILLIAM W. FISHER
BY
Brumbaugh, Free, Graves & Donohue
his ATTORNEYS

| | | |
|---|---|---|
| V | | RECTIFIED INPUT VOLTAGE |
| W | | VOLTAGE ACROSS SWITCH 22 |
| X | | VOLTAGE ACROSS SWITCH 24 |
| Y | CHARGE DISCHARGE | VOLTAGE ACROSS CAPACITOR 15 |
| Z | | VOLTAGE ACROSS INDUCTIVE LOAD 11 |

INVENTOR.
WILLIAM W. FISHER
BY
his ATTORNEYS

United States Patent Office 3,388,313
Patented June 11, 1968

3,388,313
FREQUENCY DOUBLER USING SERIES CONNECTED SWITCHES TO CONTROL LOAD CURRENT POLARITY
William W. Fisher, Woodstock, N.Y., assignor to Rotron Manufacturing Company, Inc., Woodstock, N.Y., a corporation of New York
Filed Aug. 10, 1965, Ser. No. 478,661
10 Claims. (Cl. 321—60)

ABSTRACT OF THE DISCLOSURE

A frequency doubler circuit including a rectifier for providing a full-wave rectified A.C. signal and a pair of silicon controlled rectifiers connected in series between the rectifier and reference potential. A capacitor in series with the load between reference potential and a point between the first and second silicon control rectifiers provides a current path through the load during a portion of the doubled frequency cycle and stores current for the second portion of that cycle. When the rectified voltage signal falls below the voltage charge reached by the capacitor, a control signal is developed by a transistor circuit responsive to such voltage difference to trigger the second silicon control rectifier into conduction, thereby providing a discharge path in the opposite direction through the load for the stored capacitor current. When the capacitor has sufficiently discharged, the second silicon controlled rectifier no longer conducts; this results in the development of the signal across the load-capacitor circuit, which is coupled to again bring the first silicon controlled rectifier into its conductive condition. This action initiates the following cycle of operation during the next half cycle of the alternating current input signal.

---

The invention relates to apparatus for multiplying the frequency of electrical signals, and more specifically to an apparatus for doubling the frequency of an aternating current signal supplied from a source to an electrical load.

Various forms of electrical apparatus have characteristics that are dependent upon the frequency of the supply voltage. The rotational speed of an alternating current motor, for example, is related to the frequency of the alternating current supply and an increase in motor speed can be achieved simply by increasing the supply frequency.

As can be appreciated, it is desirable to be able to change the frequency of the output of an available alternating current power source without resorting to complex oscillator circuitry or electrical machinery. Attempts have been made to provide apparatus with this capability but in general have been either too complex and expensive, or unable to provide the power requirements at increased frequencies and under varying load conditions.

It is the primary object of the present invention to provide apparatus for increasing the frequency of an alternating current power output that avoids the shortcomings of prior art devices.

A further object of the invention is to provide a frequency doubling circuit adapted to be interposed between a standard alternating current supply source and a load, which is reliable and efficient in operation, and simple and compact in construction.

Another object of the invention is to provide a frequency doubling circuit which is capable of operation over a wide range of input frequencies and which can supply adequate power for a substantial range of load conditions.

Briefly, the circuit of the invention includes a pair of switching devices having high power ratings and rapid switching characteristics connected in series across a full wave rectifier whose input is the alternating current supply. The load is connected in series with a voltage delay element, such as a storage capacitor, between the junction of the switching devices and reference potential. Control means, operating in conjunction with the storage capacitor render the switching devices alternately conducting and nonconducting to provide a current through the load at twice the frequency of the alternating current supply.

In a further embodiment, means are provided for more precisely synchronizing the input voltage with that supplied to the load, to improve the waveform and stability of the output voltage.

Figure 1:
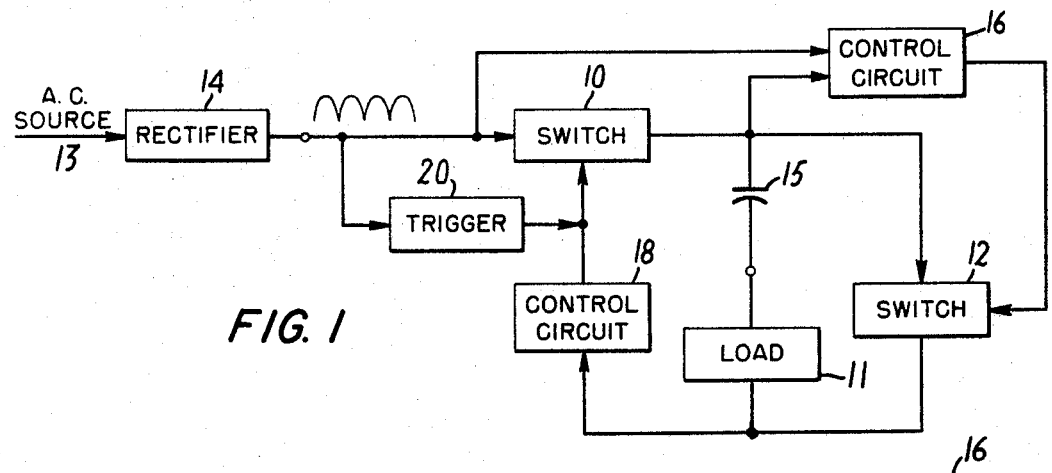
Figure 2:
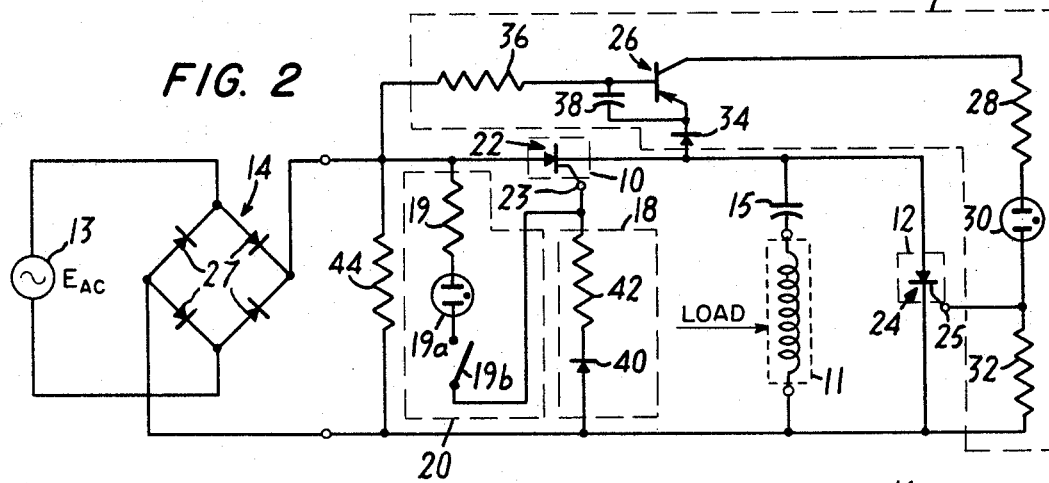
Figure 3:
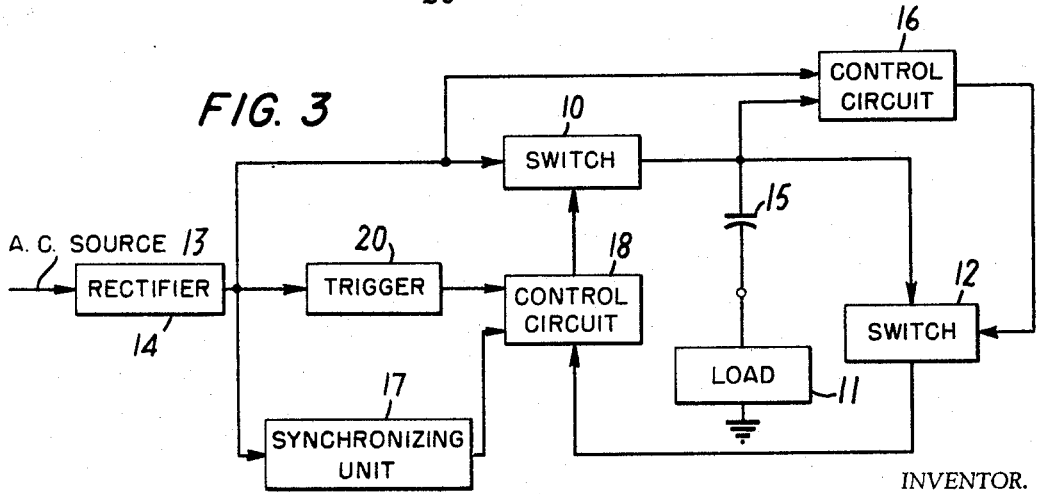
Figure 4:
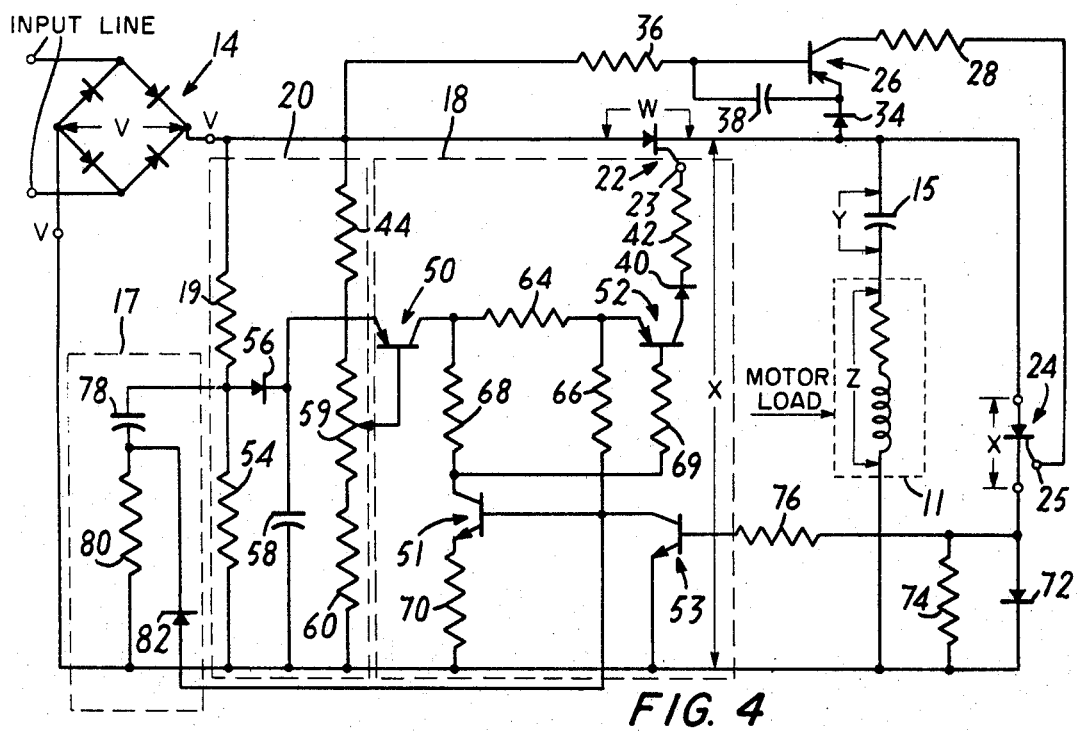
Figure 5:
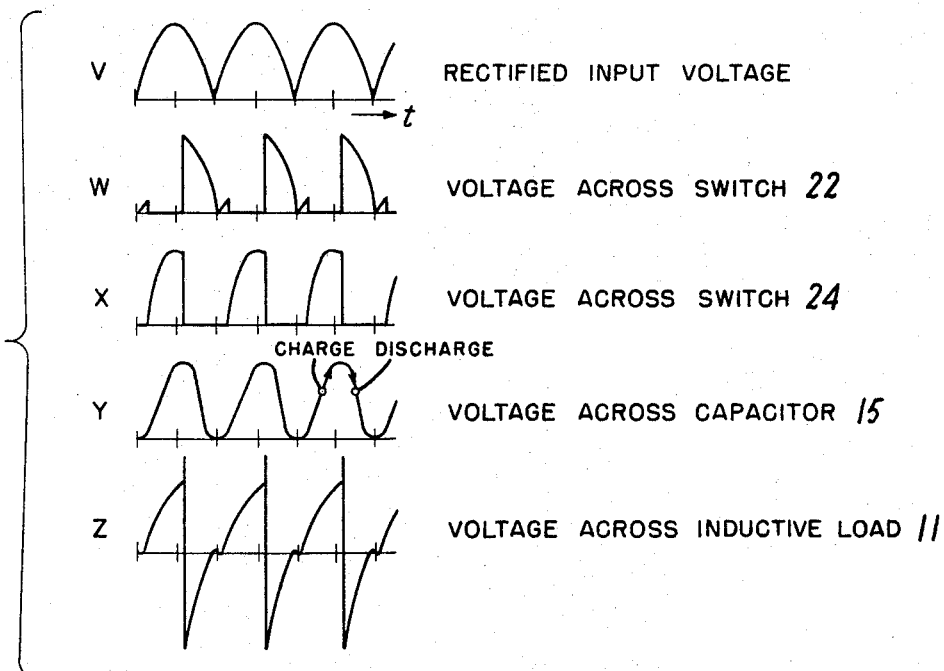

Although the invention has been described briefly above, a better understanding of it may be gained from the following detailed description, taken in conjunction with the drawings, in which:

FIGURE 1 is a a block diagram of one form of the apparatus according to the invention;
FIGURE 2 is a circuit diagram of the embodiment of FIGURE 1;
FIGURE 3 is a block diagram of another embodiment of the invention;
FIGURE 4 is a circuit diagram for the embodiment depicted in the block diagram of FIGURE 3; and
FIGURE 5 is a graph of voltage waveforms at selected points in the circuit of FIGURE 4.

Turning now to FIGURE 1, the circuit of the invention includes two switches 10, 12 connected in series and supplied with the output of a full wave rectifier 14 whose input is a source 13 of alternating current power. The switches 10 and 12, although not limited to any particular type, are preferably electronic devices which can be switched rapidly from a nonconducting into a conducting state by a pulse applied to a control element of the device and which, once conducting, are unresponsive to further signals at the control element. A first control circuit 16 senses the conduction state of the first switch and provides a trigger signal at the control element of the second switch 12. A second control circuit 18 is responsive to the conduction state of the second switch 12 and triggers the switching action of the first switch 10. Connected to the junction of the pair of switches 10, 12 is a storage capacitor 15, in series with which is the load 11. A trigger 20 is also provided to initiate the switching sequence.

In operation, switch 10 is rendered conductive by trigger means 20 and will pass the first positive going portion of the output of rectifier 14. Switch 12 is at this time held non-conductive by the control circuit 16 and current from the switch 10 flows through the capacitor 15 and the load 11 to a reference potential. Since the voltage across capacitor 15 lags the applied voltage, it will not reach its peak value (the value of the applied voltage) until the applied voltage starts to decrease. A reverse voltage is thus applied across the switch 100, turning it off. This same reverse voltage is also applied to the control circuit 16 which in turn renders the switch 12 conductive.

With switch 12 conductive, the charge stored on the capacitor 15 discharges through the load 11, setting up a current flow from said reference potential in a direction opposite to the direction of flow during the conducting period of switch 10. Eventually, the capacitor 15 discharges to the point where switch 12 no longer remains conductive. However, since with an inductive load such as a motor, the load voltage leads the voltage across the capacitor 15, it will reverse direction before the current from the capacitor has ceased flowing. Therefore, the capacitor assumes a slight charge in the other direction before switch 12 opens.

The slight reverse voltage across the capacitor is applied to the control circuit 18 which then actuates switch 10 to become conductive and the above-described sequence repeats itself. As will be apparent, a complete reversal of current flow through the load occurs for each half-cycle of the full wave rectified input, thereby doubling the frequency of the power input to the load.

FIGURE 2 is the schematic circuit of the frequency doubler of FIGURE 1. The full wave rectifier 14 may be of the conventional bridge type including four semiconductor devices 27 and is supplied with alternating current power from the source 13. The switches 10, 12 preferably are silicon controlled rectifiers (SCR) 22, 24, connected in series across the output of the rectifier 14. Silicon controlled rectifiers are three-electrode devices with operating characteristics of the thyratron type. They remain relatively non-conductive in both the reverse and forward directions until a voltage of the proper polarity and magnitude is applied to the trigger electrode. At this point, the SCR goes into a high conduction state, the current flow being limited effectively only by the external circuit impedance. Once the high conduction state is reached, the trigger electrode or gate has no further influence on the conduction of the device and it may be turned off only by interrupting the anode-cathode path or applying a reverse bias across the cathode and anode connections. Silicon controlled rectifiers have relatively high current ratings and may be rapidly and positively switched.

As shown, the control circuit 16 includes a transistor 26 whose base-emitter path is across the SCR 22, a base current limiting resistor 36, and the collector load resistors 28 and 32 in series with a neon lamp 30. A diode 34 in the emitter circuit supplies the switching pulses to the transistor 26, the capacitor 38 temporarily shunting these pulses to delay the "turn-on." The voltage developed across the load resistor 32 during conduction of the control transistor 26 is applied to the gate 25 of the SCR 24 switch (12).

The control circuit 18 comprises simply a diode 40 and a current limiting resistor 42, and, as noted previously, utilizes the voltage at the reference potential side of the load to trigger the gate 23 of the SCR 220. Initially the switch 10 (SCR 22) is turned on by a pulse supplied by the trigger 20, which includes a resistor 19, the neon lamp 19a, and the switch 19b. The load 11 in series with the capacitor 15 is represented by an inductive impedance (such as a motor), and is understood to include some resistance, as well and the capacitor 15 has been selected for near resonance with the load. An additional load resistor 44 is connected across the rectifier 14 terminals to offer a small constant load to the rectifier diodes 27.

The operation of the circuit of FIGURE 2, beginning at the start of a half-wave from the rectifier 27, is as follows: A trigger pulse is applied to the gate 23 of SCR 22 by momentarily closing the switch 19b, thus firing the neon lamp 19a and concluding the starting, or trigger, circuit to the gate 23. SCR 22 is now in the conduction state and the rectified voltage charges the capacitor 15 so that current flows in a clockwise direction in the circuit loop completed by the load 11. With the circuit in this condition, the transistor 26 and the SCR 24 are "off." Shortly after the magnitude of the applied half-wave voltage has reached its peak and begins to fall, the capacitor 15 will have attained a voltage at the junction of the SCR switches 22, 24 higher than the instantaneous voltage at the anode of the SCR 22. At this point the SCR 22 is under reverse bias and turns off. The only path for the charge on the capacitor 15 to assume at this point is through the diode 34, the parallel paths of capacitor 38 and the emitter-base circuit of transistor 26, and through the base resistor 36. The transistor 26, being of PNP conductivity, now conducts, firing the neon lamp 30 and developing a pulse at the gate 25 of the SCR 24.

The SCR 24, thus switched on, completes a discharge path for the remaining charge on the capacitor 15, the current in this case following a clockwise loop through the load, the capacitor 15, and the SCR 24. The current through the load has thus reversed direction and continues until the capacitor 15 is nearly discharged, at which time the voltage across the SCR 24 is too small to cause current flow. When the discharge path of the capacitor 15 is interrupted, however, a positive pulse is developed at the anode of the diode 40, owing to the abrupt discontinuity in current flow. This pulse is transmitted through the diode 40 and the resistor 42 to the gate 23 of the SCR 22, and the sequence repeats. Since the current through the load 11 reverses twice during a single half-wave of the applied voltage, the applied voltage frequency as seen by the load is doubled.

FIGURE 3 is a block diagram of af requency multiplier which operates on the same principle as the doubler of FIGURES 1 and 2. This embodiment of the invention includes a synchronizing unit 17 which, in conjunction with an improved control circuit 18 and the trigger 20, delays the triggering action of the switch 10 so that the phase and frequency of the load voltage is slaved to the phase and frequency of applied voltage. The synchronizing unit 17 ensures that the control circuit 18 will not turn on switch 10 until a new half-wave cycle has begun.

The operation of this circuit will be better understood by referring to the circuit schematic of FIGURE 4 which shows a frequency doubler incorporating the synchronizing unit 17. To simplify the explanation of the operation of this circuit, the circuit elements in FIGURE 4 having identical or analogous functions to the elements of FIGURE 2 have been assigned the same numbers.

In the frequency doubler of FIGURE 4, more positive and reliable switching control of the switch 10 is provided by a control circuit 18 which includes the transistors 50, 51, 52 and 53, along with the associated circuitry. The initial trigger pulse to turn on the SCR 22 is provided by the trigger 20 comprised of voltage dividing resistors 19 and 54, the diode 56, and the capacitor 58. An adjustable potentiometer 59 and a fixed resistor 60 have been added in series with the load resistor 44 to form a voltage dividing network for supplying a bias voltage to the base of the transistor 50.

With the aid of the voltage waveforms illustrated in FIGURE 5, the operation of the circuit of FIGURE 4 can be explained as follows: A rectified alternating current voltage supplied by the full-wave rectifier 14 is applied to the circuit terminals V—V. The waveform of this voltage is shown in graph V of FIGURE 5. A portion of this voltage is converted to a direct current voltage by the trigger filter network comprising the resistor 19, the diode 56 and the capacitor 58, and is coupled to the emitter of the transistor 50. Since the transistor 50 is of PNP conductivity, it will be cut off as long as the base voltage set by an adjustment of the potentiometer 59 exceeds the emitter voltage supplied by the filter network. When the rectified voltage is applied to the trigger 20, the capacitor 58 charges, and a voltage builds up at the emitter of the transistor 50 with successive half-wave excursions of the rectified applied voltage. Then, when the amplitude of the rectified applied voltage is low, the transistor 50 is forwardly biased and conducts.

When the transistor 50 conducts, a positive voltage is applied to the base of the transistor 51 through the resistors 64 and 66. At this point the PNP transistor 52 is still cut off, since the voltage at its base (coupled to the collector of the transistor 50 by the resistors 68 and 69) is higher than the voltage at the junction of resistors 64 and 66. The positive potential at the base of the NPN transistor 51, however, renders transistor 51 conductive, whereby its collector and emitter currents flow through the resistors 68 and 70, respectively. The voltage drop caused by the current flow through resistor 68 in turn puts the transistor 52 in the conduction region. Transistor 52, therefore, now conducts, and a trigger voltage is supplied to the gate 23 of the first switch 22 via the diode 40 and the resistor 42. The resistor 42 limits the gate current, whereas the diode 40 prevents high voltages at the cathode of the SCR 22 from entering the collector circuit of the transistor 52. Meanwhile, the transistor 50 has again been rendered non-conductive, because as the rectified voltage (and therefore the base voltage) begins to rise, the transistor 50 is biased to cut off.

Current is now supplied to the load circuit in a manner identical to the operation of the circuit of FIGURE 2; i.e., the capacitor 15 charges to a point where the SCR 22 is under a reverse bias and cuts off, whereupon the monetary discharge of capacitor 15 through the diode 34, the capacitor 38 and the resistor 36 renders the transistor 26 conductive and provides a trigger signal via the resistor 28 to the gate 25 of the second switch 24. The SCR 24 now provides a discharge path for the capacitor 15, the current loop being completed by the diode 72. From this point on, however, the action of the circuit of FIGURE 4 differs from that of FIGURE 2.

When the SCR 24 switches on near the peak of the applied half-wave cycle, a small voltage is developed across the diode 72 and its parallel resistor 74. This voltage is coupled to the base of the transistor 53 through the base resistor 76 and biases the transistor 53 to the conducting region, bearing in mind that the transistor 53 is of the NPN conductivity type. The conduction of the transistor 53, in effect, couples the resistor 66 to the common terminal of the circuit through a relatively small impedance. This, in turn, lowers the base voltage of transistor 51 to a point where the transistor 51 is essentially non-conducting. This change is reflected in a voltage increase at the collector of the transistor 51 and, hence, at the base of the transistor 52. The transistor 52 is now maintained off as long as the second switch 24 is conducting, regardless of the conduction state of the transistor 50. Thus, the possibility of a short circuit occuring because of the simultaneous conduction of the SCR switches 22 and 24 is eliminated.

The voltage waveforms across the SCR switch 22, the SCR switch 24, the capacitor 15, and the load 11 are illustrated in FIGURE 5, by curves designated W, X, Y, and Z, respectively. The small flattened portion at the top of the X waveform is brought about by the delay occurring between the times when the SCR switch 22 cuts off and the transistor 26 goes into conduction. This delay occurs because of the shunting action of the capacitor 38, which retards slightly the buildup of the transistor 26 base-emitter voltage to ensure that the SCR switch 22 is off before triggering the SCR switch 24.

As can be observed from the waveform Z of FIGURE 5, representing in this case the waveform across an inductive load, the capacitor 15 may be completely discharged before the rectified input voltage has fallen to zero. If this is the case, it will be recalled that the transistor 50 can become conductive at some small positive voltage near zero, regardless of whether the slope of the applied rectified voltage waveform is positive or negative.

In order to prevent premature triggering of the SCR 22 and to assure that the frequency-doubled waveform is synchronized with the rectified input voltage, the delay, or synchronizing, circuit 17 is provided which prevents the triggering of switch 22 until the slope of the input voltage curve is positive. This circuit is constituted of the capacitor 78, the resistor 80 and the diode 82, the anode of which is connected to the junction of the resistor 66 and the base of the transistor 51.

A portion of the input voltage is applied through the resistor 19 to the capacitor 78 and the resistor 80. When the input voltage is rising, the capacitor 78 charges and a positive voltage appears at the junction of the capacitor 78 and the resistor 80. As the input voltage falls, the capacitor 78 discharges and the direction of current through the resistor 80 reverses, thus creating a negative potential across the resistor 80 with respect to the circuit common terminal. Thus, if the transistor 50 is conducting prematurely, i.e., if it is conducting when the slope of the rectified input voltage is negative, the diode 82 conducts, lowering the base voltage of the transistor 51 and holding the transistor 52 "off" until the slope of the input voltage becomes positive.

When the delay, or synchronizing circuit 17 is employed, the selection of components of the circuit, including the transistors 50, 51, 52, and 53 is much less critical. Moreover, as mentioned above, the conduction region of the transistor 50 can be adjusted so that the switching sequence is initiated very nearly at the proper instant.

The circuit described above thus provides a frequency doubler which is very versatile and which has extremely good current handling capabilities. For example, a frequency doubler according to the invention can be used to drive inductive loads, such as motors, having a wide range of power input requirements. In addition to the foregoing advantages the circuit can provide an output which is synchronized with the alternating current source with which the apparatus is used.

It is understood that the specific embodiments of the invention described herein are representative only, and modifications and variations may be made therein within the skill of the art. Accordingly, the invention is intended to embrace all such modifications and variations as come within the scope of the appended claims.

I claim:

1. Apparatus for multiplying the frequency of a cyclic signal supplied from a rectified alternating current source to a load, comprising first and second switching means coupled in series relationship between the source and a reference potential, current storage means in series with the load between reference potential and a point in the series path between said first and second switching means for providing a current path from the source to the load and storing current when the first switching means is conductive and for providing a source of current for the load when the second switching means is conductive, and means responsive to the voltage developed across said current storage means for rendering said first and second switching means alternately conducting to provide alternately conducting paths for the current through the load during each half cycle of the alternating current signal.

2. Apparatus in accordance with claim 1 wherein said current storage means is a reactive element selected for near resonance with the reactive component of the load at the multiplied frequency.

3. Apparatus for multiplying the frequency of a signal supplied from a rectified alternating current source to a load, comprising first and second switching means coupled in series relationship between the source and a reference potential, a capacitor in series with the load between reference potential and a point in the series path between said first and second switching means to provide a current path from the source to the load and storing current when the first switching means is conductive, a first control circuit responsive to the potential between the rectified alternating current source signal and the potential of the capacitor for triggering the conduction of said second switching means to provide a path through the load for the current stored in the capacitor, and a second control circuit responsive to a voltage level of the capacitor for triggering the conduction of said first switching means at the end of the frequency multiplied cycle.

4. Apparatus in accordance with claim 3 comprising means responsive to said rectified source signal and coupled to said second control circuit for synchronizing the occurrence of the cycles of said frequency multiplied signal with the occurrence of the cycles of said source signal.

5. Apparatus in accordance with claim 3 wherein said first and second switching means are rectifiers having anode and cathode connections and a third connection for receiving a signal from the respective control circuits for alternately triggering said rectifiers into conduction.

6. Apparatus for multiplying the frequency of a signal supplied from an alternating current source to a load comprising, in combination, means for rectifying the alternating current source signal, first and second switching means coupled in series between the rectifying means and a reference potential, current storage means connected in series with the load between reference potential and the series path between said first and second switching means, a first transistor circuit responsive to a voltage developed between said rectifying means and current storage means for developing a signal to control the state of conduction of said second switching means, and a second transistor circuit responsive to the voltage across the current storage means for rendering said first switching means conductive when said second switching means is non-conductive.

7. Apparatus for multiplying the frequency of a signal supplied from a rectified alternating current source to a load, comprising first and second unidirectionally conducting switching means coupled in series between the source and reference potential, a series circuit including a capacitor and the load connected between reference potential and the series path between said first and second switching means to charge the capacitor by the source signal when the first switching means is conductive, a first transistor responsive to a polarity of the source voltage relative to a voltage developed across said capacitor for providing a trigger signal to said second switching means, a second transistor operable between two conductive states and connected to trigger the conduction of said first switching means when in one state of conduction, a first transistor control circuit responsive to a predetermined level of said rectified source signal for placing said second transistor in said one conductive state, and a second transistor control circuit responsive to the state of conduction of said second switching means for biasing said second transistor to its other conductive state when said second switching means is conducting to prevent premature conduction of the first switching means.

8. Apparatus in accordance with claim 7 further comprising means responsive to said rectified source signal for biasing said second transistor to said other conductive state whenever the slope of the rectified source signal is of a predetermined polarity.

9. Apparatus for doubling the frequency of a signal supplied from the terminals of a rectified alternating current source to a load comprising, first and second rectifiers having control elements and connected in series across the source terminals, a capacitor in circuit with the load between the junction of said first and second rectifiers and one terminal of the source, a first transistor responsive to a voltage developed across said capacitor for providing a trigger signal to said element of said second rectifier, a second transistor adapted to provide a trigger signal to the control element of said first rectifier, a first transistor control circuit responsive to minimal amplitudes of said rectified source signal for triggering the conduction of said second transistor, and a second transistor control circuit responsive to the conduction state of said second rectifier for biasing said second transistor to a non-conducting state when said second rectifier is conducting.

10. Apparatus for doubling the frequency of an alternating current signal, comprising a rectifier for developing a full-wave rectified signal, first and second unidirectionally conducting switch means coupled in series relationship between the source and reference potential, a current storage element in series with the load between reference potential and a point in the series path between said first and second switch means for providing a current path between the source and load when the first switch means is conductive, switch control means responsive to the potential difference between the rectified source signal and the instantaneous voltage attained by the current storage means during conduction of the first switch means for providing a signal to the second switch means and render it conductive when the first switch means is non-conductive, the current storage element discharging through the load when the second switch means is conductive, and means responsive to the polarity of the voltage across the current storage element to render said first switch means conductive when the second switch means is non-conductive.

References Cited
UNITED STATES PATENTS

| | | | |
|---|---|---|---|
| 2,906,962 | 9/1959 | Roth et al. | 307—108 X |
| 3,188,490 | 6/1965 | Hoff et al. | 307—88.5 |
| 3,229,191 | 1/1966 | Williamson | 321—45 |
| 3,287,571 | 11/1966 | White | 307—88.5 |
| 3,319,147 | 5/1967 | Mapham | 321—60 X |

JOHN F. COUCH, *Primary Examiner.*

G. GOLDBERG, *Assistant Examiner.*